United States Patent
Nomura

[19]

[11] Patent Number: 6,102,806

[45] Date of Patent: Aug. 15, 2000

[54] DAMPER MECHANISM

[75] Inventor: Kunihiro Nomura, Osaka, Japan

[73] Assignee: Exedy Corporation, Osaka, Japan

[21] Appl. No.: 09/160,193

[22] Filed: Sep. 25, 1998

[30] Foreign Application Priority Data

Sep. 29, 1997 [JP] Japan .................................. 9-263791

[51] Int. Cl.$^7$ .................................................. F16D 13/64
[52] U.S. Cl. ...................... 464/68; 192/213.22; 192/214
[58] Field of Search .............................. 464/68; 192/212, 192/213.2, 213.21, 213.22, 214, 214.1

[56] References Cited

U.S. PATENT DOCUMENTS

| | | | |
|---|---|---|---|
| 4,180,622 | 12/1979 | Burkhard et al. .............. | 192/107 M X |
| 4,689,954 | 9/1987 | Billet ..................................... | 464/68 X |
| 4,816,006 | 3/1989 | Friedmann .......................... | 192/212 X |
| 4,836,350 | 6/1989 | Kubel et al. ............................ | 192/212 |
| 5,125,872 | 6/1992 | Reik ..................................... | 464/68 X |
| 5,541,006 | 7/1996 | Conley ..................................... | 428/552 |
| 5,782,694 | 7/1998 | Honjo et al. ..................... | 192/213.2 X |

OTHER PUBLICATIONS

JIS Handbook (Japanese Industrial Standards Handbook), pp. 128 and 506, Tokyo, Japan.

Measurement For Surface Management Q & A 1000, pp. 131 and 132published 1995 by Industrial Technology Service Center, Tokyo, Japan [English translation provided].

HVOF (High Velocity Oxygen Fuel) Thermal Spray Process, downloaded from INTERNET Nov. 1999 http://ml.aol.com/getscc/hvof.htm.

*Primary Examiner*—Rodney H. Bonck
*Attorney, Agent, or Firm*—Shinjyu an Intellectual Property Firm

[57] ABSTRACT

A clutch disk assembly 1 includes a clutch plate 3, a retaining plate 4, a hub 5 and a large torsion springs 8. The clutch and retaining plates 3 and 4 have first convex portions 13. A first window 17 corresponding to the first convex portion 13 is formed in a flange 5a of the hub 5. The large torsion spring 8 is arranged in the first convex portion 13 and the first window 17 for circumferentially coupling the clutch and retaining plates 4 and 5 to the flange 5a.

5 Claims, 6 Drawing Sheets

DAMPER MECHANISM

BACKGROUND OF THE INVENTION

A. Field of the Invention

The present invention relates to a damper mechanism, and particularly a damper mechanism for transmitting a torque and damping a torsional vibration.

B. Description of the Background Art

A damper mechanism is a device used in a power transmission device for transmitting torque and for absorbing and damping a torsional vibration transmitted with the torque. The damper mechanism is incorporated in a clutch disk assembly of a clutch, a flywheel assembly or the like used in an automobile. The damper mechanism is basically formed of a first rotary member, a second rotary member and elastic members such as springs which are arranged between the first and second rotary members. The elastic members are compressed between the first and second elastic members when these members rotate relatively to each other.

The clutch disk assembly is basically formed of a clutch disk having friction facings, a pair of circular plate members fixed to the clutch disk, an output hub having a flange which is arranged between the circular plate members, and torsion springs for elastically coupling the flange to the circular plate pair in the circumferential direction. In this structure, a damper mechanism is formed of the circular plate member pair, the flange of the hub and the torsion springs.

Each torsion spring is a coil spring, and is disposed in a window or opening which is formed in the flange. Each of the circular plate members is provided at portions corresponding to the windows or the torsion springs with accommodating or retaining portions, which are axially expanded or are partially cut and bent axially outward. The retaining portions of the paired circular plate members restrict the radially and axially outward movements of the torsion springs.

When the clutch is engaged, the clutch disk assembly rotates together with a flywheel. A centrifugal force produced thereby moves the torsion springs radially outward, and forces them into contact with the radially outer sides, e.g., of the retaining portions of the circular plate members. When a torsional vibration is transmitted to the damper mechanism in the above state, the torsion springs are repeatedly compressed and restored so that they slide with respect to the retaining portions of the paired circular plate members. As a result, either of both of the retaining portions and the torsion springs are liable to wear and break.

In recent years, clutches of automobiles are operated less times owing to development of freeways so that life-times of the clutch disks (friction facings) have increased. Accordingly, the clutch disk assembly can be used until the circular plate member or the torsion spring breaks due to sliding of the spring on the retaining portion of the circular plate member. Accordingly, it is important to reduce wear caused by sliding of the springs for increasing the whole life-time of the clutch disk assembly.

The prior art has employed heat treatment, metal plating or the like for reducing the wear due to sliding of the spring on the retaining portion of the clutch disk assembly. However, these methods sometimes experience premature failure if the treated surface layer becomes worn.

SUMMARY OF THE INVENTION

One object of the invention is to reduce wear of various members in the damper mechanism which may be caused by sliding contact between springs and adjacent members.

According to a first aspect of the present invention, a damper mechanism includes a first rotary member, a second rotary member, a spring and a wear-resistant layer. The first rotary member has a first retaining portion. The second rotary member has a second retaining portion corresponding to the first retaining portion. The spring is disposed in the first and second retaining portions, and circumferentially couples the first and second rotary members together. The wear-resistant layer is formed by flame spraying on a spring contact portion of at least one of the first and second rotary members.

The wear-resistant layer is formed by the flame spraying improving hardness of the spring contact portion of at least one of the first and second retaining portions. As a result, wear of the spring contact portion is suppressed.

Preferably the damper mechanism has a wear-resistant layer made of hard metal. Therefore, the layer has a sufficiently high hardness. The hard metal is made of carbide of IVa-, Va- or VIa-group metal sintered with a binder made of iron-family metal such as cobalt or nickel.

Preferably a feature the wear-resistant layer is made of a WC-Co material (Tungsten, Carbon, Cobalt material). Since the WC-Co material has a high wear resistance, wear of at least one of the first and second retaining portions is sufficiently suppressed. Also, wear of the spring is reduced. Preferably the spring is a coil spring made of a wire spring metal material. The wire spring metal material is a wire spring metal material under the JIS (Japanese Industrial Standards), and contains SW, SWP, SWO, SWO-V, SWOCV-V, SWOSC-V, SWOSM, SWOSC-B, SUS-WP and others.

Preferably the wear-resistant layer is formed by flame spraying. Since continuous combustion flames are used, the wear resistance layer is formed finely.

Preferably the wear-resistant layer is formed by fast flame spraying. Since fast flames are produced owing to an increased pressure in a combustion chamber, a layer forming speed is high, and the layer is finely formed.

Preferably the wear-resistant layer is formed by flame spraying of an HVAF (High Velocity Air Fuel System).

In the damper mechanism, the HVAF flame spraying can further improve the wear-resistant layer. Particularly, by performing HVAF flame spraying of the WC-Co material, the wear-resistant layer is further improved because the HVAF flame spraying is suitable to formation of a wear-resistant layer of a carbide.

In accordance with another aspect of the present invention, a damper mechanism of the present invention includes first and second circular plate members, a third circular plate member, a coil spring and a wear-resistant layer. The first and second circular plate members are fixed together with an axial space therebetween, and have retaining portions corresponding to each other. The third circular plate member is disposed between the first and second circular plate members, and is provided with a window corresponding to the retaining portion. The coil spring is disposed in the retaining portions and the window for circumferentially coupling the first and second circular plate members to the third circular plate member. The wear-resistant layer is formed by HVAF (High Velocity Air Fuel System) flame spraying of a WC-Co material at a portion of the retaining portion relatively sliding on the coil spring.

The HVAF flame spraying of the WC-Co material can form the wear-resistant layer having a good wear resistance. Consequently, wear of the retaining portions of the first and second circular plate members are reduced, and wear of the coil spring is also reduced.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
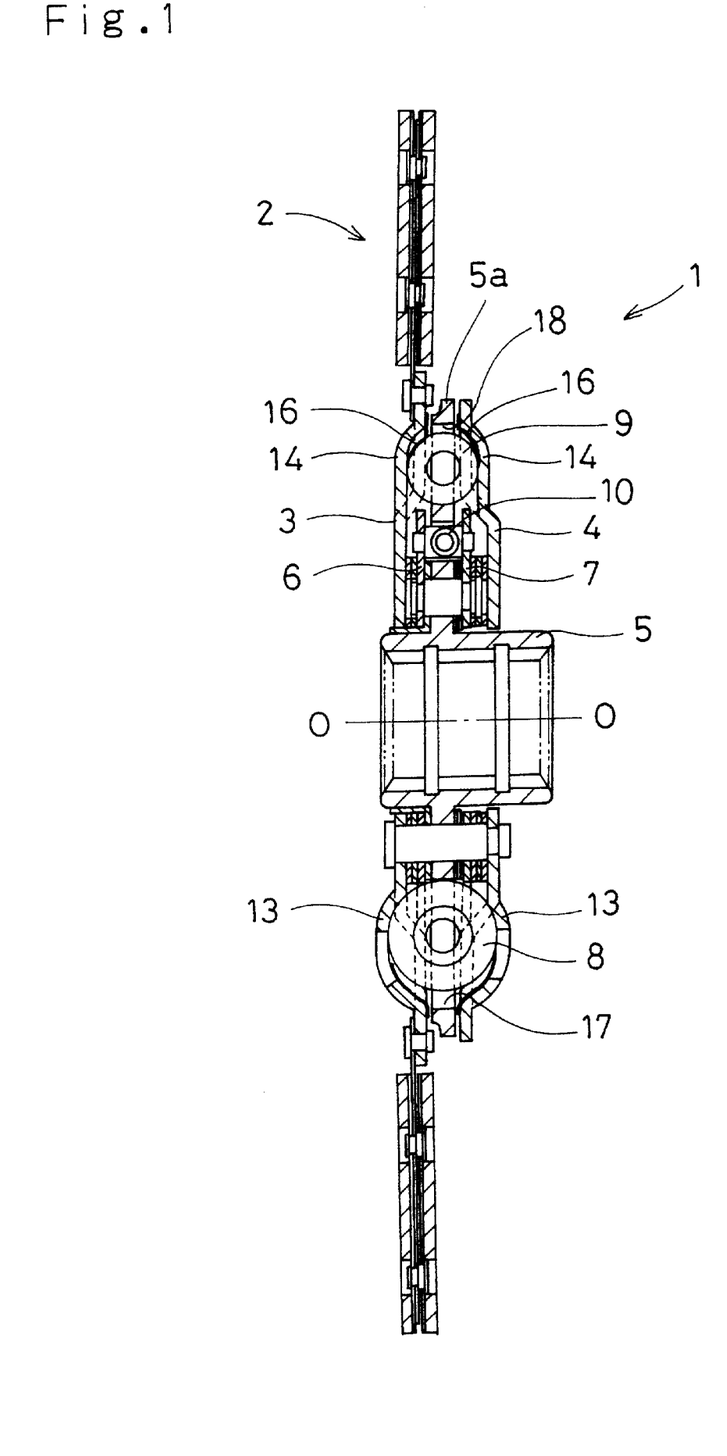
FIG. 1 is a schematic cross section side view of a clutch disk assembly in accordance with a first embodiment of the present invention.
Figure 2:
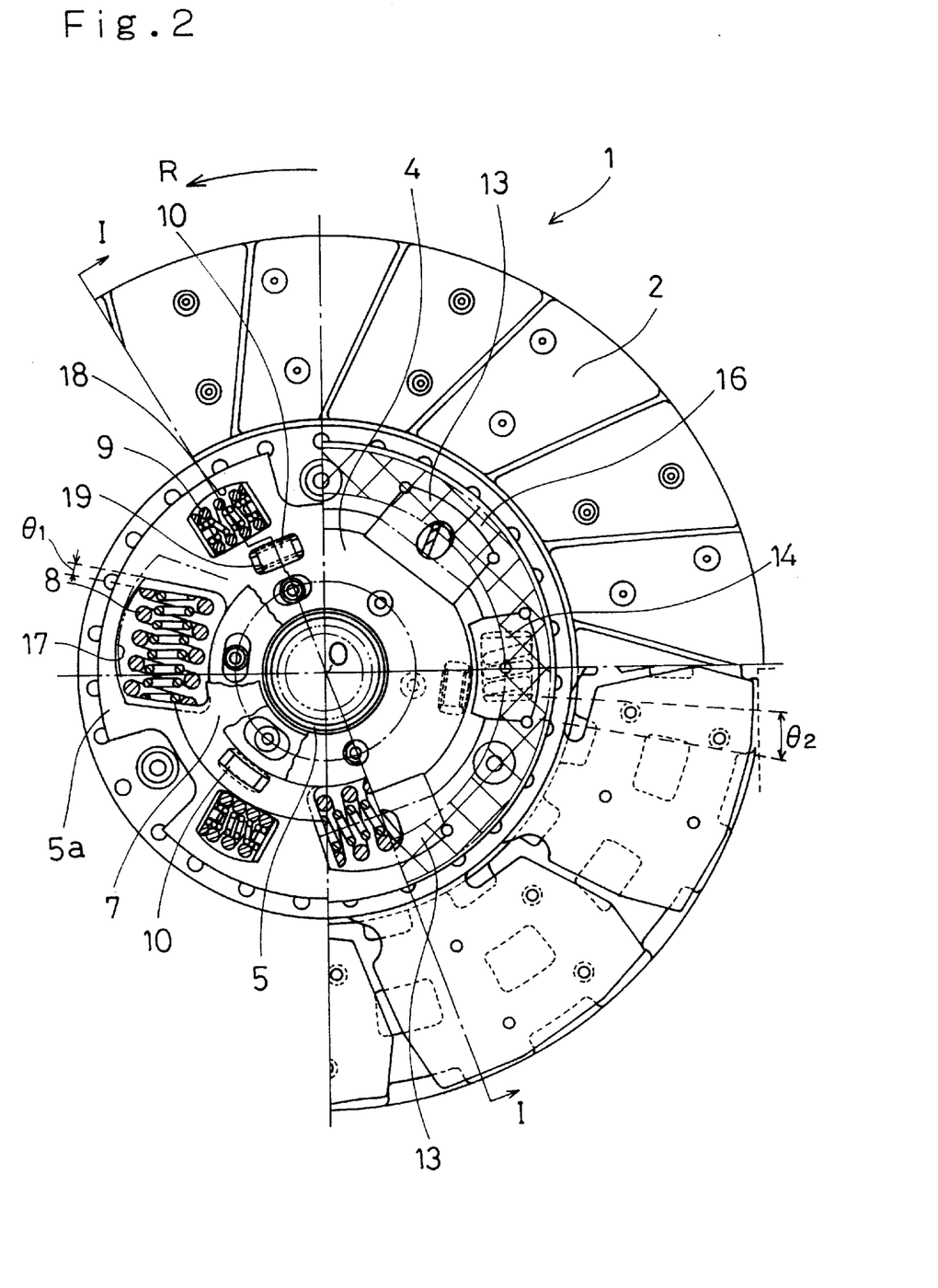
FIG. 2 is a part elevation, part cutaway, rear view of the clutch disk assembly depicted in FIG. 1.

FIGS. 1 and 2 shows a clutch disk assembly 1 used in a clutch of an automobile. The clutch disk assembly 1 has a clutch function for controlling engagement with a flywheel (not shown) as well as a damper function for absorbing and damping a torsional vibration. Line O—O in FIG. 1 represents a rotation axis of the clutch disk assembly 1, and a direction R shown in FIG. 2 represents the direction of rotation of the clutch disk assembly 1.

The clutch disk assembly 1 is basically formed of a clutch disk 2, a clutch plate 3, a retaining plate 4, a hub 5, first and second side plates 6 and 7, large torsion springs 8, middle torsion springs 9 and small torsion springs 10.

The clutch disk 2 is an annular assembly formed of a pair of friction facings and a plate disposed therebetween. The clutch disk 2 is disposed between a friction surface of a flywheel (not shown) and a pressure plate (not shown).

The clutch and retaining plates 3 and 4 are circular members disposed in a radially inner portion of the clutch disk 2, and are axially spaced from each other. The plates 3 and 4 are fixed together by pins for integral rotation. The outer peripheral portion of the clutch plate 3 is coupled to the plate of the clutch disk 2 by rivets. The plates 3 and 4 are made of, e.g., SPHC or SCM415 (as specified in the Japanese Industrial Standards) subjected to gas carbonitriding quenching.

The hub 5 has a cylindrical boss fitted into central apertures of the plates 3 and 4, and a flange 5a extending radially outward from the boss. The flange 5a is located axially between the plates 3 and 4. The boss of the hub 5 is unrotatably and axially movably engaged with the shaft extending from a transmission (not shown).

The flange 5a is provided with a plurality of first windows 17 which are circumferentially equally spaced from each other. The flange 5a is also provided with second openings 18 circumferentially adjacent to rear-ward rotational sides, with respect to the rotating direction R, of the first windows 17, respectively. The second windows 18 are smaller in circumferential and radial sizes than the first windows 17. However, the radially outer edges of the first and second windows 17 and 18 are located about the same distance from the center of the clutch disk assembly 1.

Each first window 17 accommodates the large torsion spring 8. Each of the large torsion springs 8 includes a large coil spring and a small coil spring as is shown in FIG. 2. Each of the circumferentially opposite ends of the large torsion spring 8 is spaced by a predetermined angle $\theta_1$ from the neighboring radially extending edge of the first window 17. The middle torsion spring 9 is arranged in each second window 18. The circumferentially opposite ends of the middle torsion spring 9 are engaged with the circumferentially opposite ends of the second window 18 via spring seats, respectively.

Each of the plate 3 and 4 is provided with axially projected first convex portions 13 which correspond to the first windows 17 and large coil springs 8, and are formed by, for instance, a drawing process. Each first convex portion 13 is provided at its center with an aperture. The plates 3 and 4 are provided with second convex portions 14 corresponding to the second windows 18 and the middle torsion springs 9 respectively.

The circumferentially opposite ends of each first convex portion 13 are in contact with the circumferentially opposite ends of the corresponding large torsion spring 8. The circumferentially opposite ends of each second convex portion 14 are spaced by a predetermined angle $\theta_2$ from the circumferentially opposite ends of the corresponding middle torsion spring 9, respectively.

The first and second convex portions 13 and 14 are formed such that in an axial direction relative to the clutch disk assembly 1 the inner surfaces of the first and second convex portions 13 and 14 are very close to the torsion springs 8 and 9 thus restricting the radially and axial outward movements of the torsion springs 8 and 9, respectively. Due to the shape of the first and second convex portions 13 and 14, the torsion springs 8 and 9 are radially spaced from the outer peripheries of the windows 17 and 18, respectively as is indicated in FIG. 2. Even when a torsional vibration is transmitted, the torsion springs 8 and 9 can slide on the radially outer portions of the first and second convex portions 13 and 14, and are effectively prevented from sliding on the outer peripheries of the first and second windows 17 and 18.

With reference to FIG. 1, the first side plate 6 is disposed axially between the plate 3 and the flange 5a. The second side plate 7 is disposed axially between the flange 5a and the plate 4. The first and second side plates 6 and 7 have outer diameters that are smaller than the outer diameter of the plates 3 and 4. The first and second side plates 6 and 7 are non-rotatably coupled together. The first and second side plates 6 and 7 are provided with engagement portions which are engaged with radially inner sides of the torsion springs 8.

The small torsion springs 10 are arranged in third openings formed in the flange 5a, respectively. The circumferentially opposite ends of each small torsion spring 10 are seated on axially extending spring seats, respectively. The spring seats are arranged in circumferentially opposite ends of recesses formed in the first and second side plates 6 and 7. The large coil springs 8 and the small coil springs 10, between which the first and second side plates 6 and 7 are arranged as described above, operate in series to couple the plates 3 and 4 to the flange 5.

Each torsion spring is made of a wire spring metal material as defined in the JIS (Japanese Industrial Standards).

An annular wear-resistant layer 16 is formed at the radially outer portion of each of the plates 3 and 4 and, more specifically, at its axially inner surface opposed to the flange 5a. The wear-resistant layer 16 is made of a WC-Co material (Tungsten-Carbon-Cobalt material) applied by flame spraying of an HVAF (High Velocity Air Fuel System). The WC-Co material contains Co at 17% by weight and preferably 12%–25% by weight. The wear-resistant layers 16 in particular cover the radially outward portions the first and second convex portions 13 and 14 of the plates 3 and 4, and also cover flat portions between the windows as well as the flat portions radially outside the first and second convex portions 13 and 14. The wear-resistant layers 16 improve the hardness of the first and second convex portions 13 and 14 thus reducing wear due to engagement between the plates 3 and 4 and the springs 8 and 9 as the springs slide during compression and expansion.

According to the above structure, the small torsion springs 10 circumferentially elastically couple the first and second side plates 6 and 7 to the flange 5a, and the large torsion springs 8 circumferentially elastically couple the plates 3 and 4 to the first and second side plates 6 and 7 or the flange 5a. The middle torsion springs 9 circumferentially elastically couple the plates 3 and 4 to the flange 5a. It can be seen that each kind of the torsion springs 8, 9 and 10 provides a different level of damping to the damper mechanism.

More specifically, in the damper mechanism employing the large torsion springs 8, the plates 3 and 4 form first rotary members, first and second side plates 6 and 7 form second rotary members when the torsion angle is not larger than the angle $\theta_1$, and the flange 5a forms the second rotary member when the torsion angle exceeds the size of the angle $\theta_1$. The first convex portions 13 define first retaining portions of the first rotary members, and either the engagement portions of the first and second side plates 6 and 7 or the first windows 17 in the flange 5a form second retaining portions of the second rotary member(s) depending on the size of the torsion angle.

In the damper mechanism employing the middle torsion springs 9, the plates 3 and 4 form the first rotary members, and the flange 5a forms the second rotary member. The second convex portions 14 form first retaining portions of the first rotary members, and the second windows 18 of the flange 5a form second retaining portions of the second rotary member.

In the two damper mechanisms described above, the foregoing wear-resistant layer 16 is formed in particular at spring contacting portions of each of the first retaining portions of the first rotary members.

It can also be considered that each of the two damper mechanisms described above is formed of first and second circular plate members, a third circular plate member and the coil springs.

In the damper mechanism employing the large torsion springs 8, the clutch and retaining plates 3 and 4 form the first and second circular plate members, respectively, first and second side plates 6 and 7 form the third circular plate members when the torsion angle is not larger than the angle $\theta_1$, and the flange 5a forms the third circular plate member when the torsion angle exceeds the angle $\theta_1$. The first convex portions 13 form the retaining portions of the first and second circular plate members, and the engagement portions of the first and second side plates 6 and 7 or the first windows 17 in the flange 5a form the windows of the third circular plate member(s) depending on the torsion angle.

In the damper mechanism employing the middle torsion springs 9, the plates 3 and 4 form the first and second circular plate members, respectively, and the flange 5a forms the third circular plate member. The second convex portions 14 form retaining portions of the first and second circular plate members, and the second windows 18 in the flange 5a form the windows of the third circular plate member.

In each of the damper mechanisms described above, the foregoing wear-resistant layer 16 is formed at spring contacting portion of each of the retaining portions of the first and second circular plate members.

Figure 3:
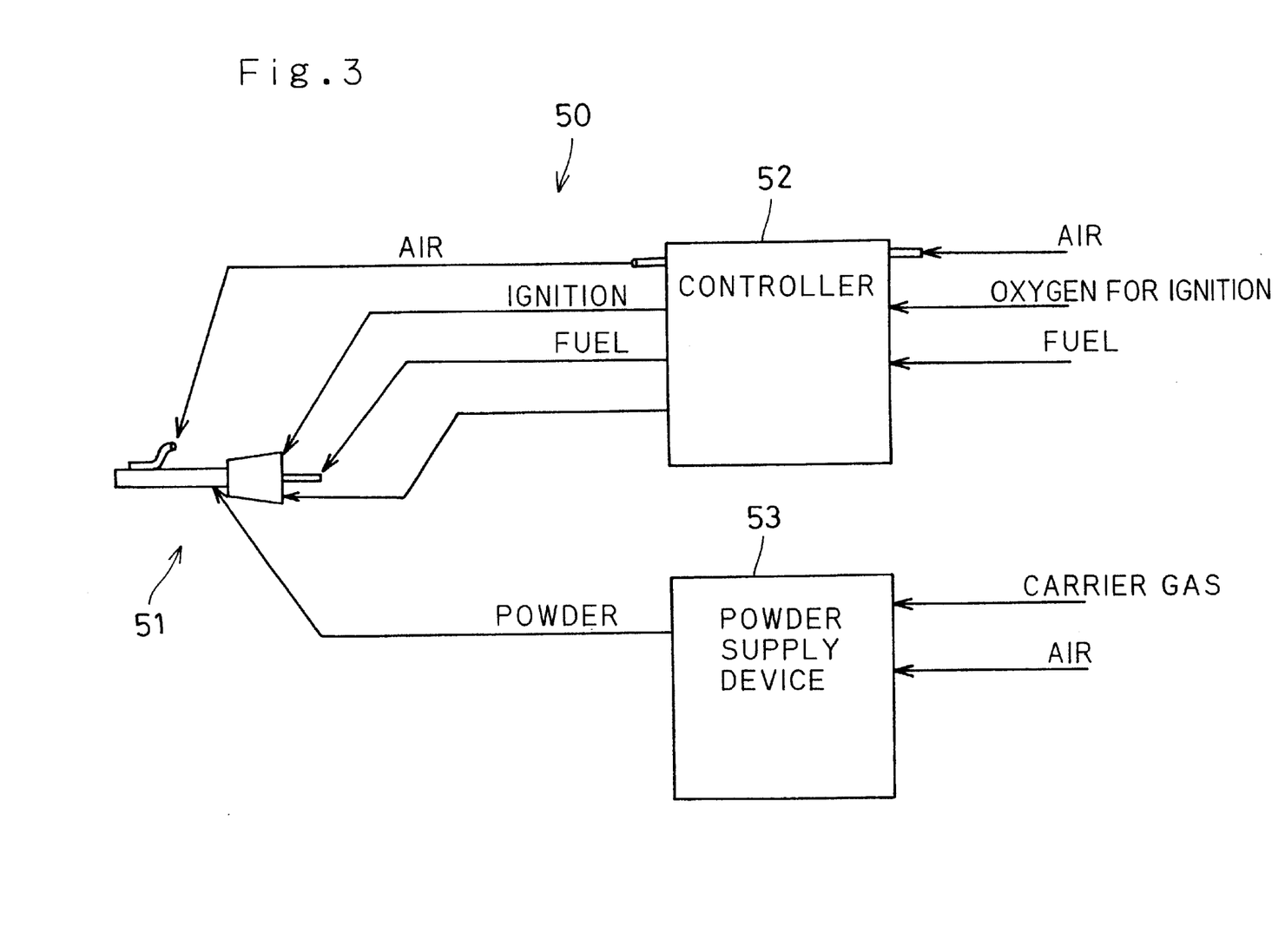
FIG. 3 is a block diagram showing a structure of an HVAF flame spraying device.

FIG. 3 is a block diagram showing a structure of a spray coating or flame spraying device 50 of the HVAF (High Velocity Air Fuel System). The HVAF flame spraying device 50 is basically formed of a rocket gun 51, a controller 52 and a powder supply device 53.

A chamber for burning the fuel is arranged in the rocket gun 51.

The controller 52 is externally supplied with air, oxygen for ignition and fuel. The controller 52 supplies air, oxygen (for ignition) and fuel as well as a chamber pressure to the rocket gun.

The powder supply device 53 is externally supplied with carrier gas and air. The powder supply device 53 supplies powder of a WC-Co material to the rocket gun 51.

The HVAF flame spraying device described above sprays the WC-Co material, e.g., to the clutch plate 3.

More specifically, the clutch plate 3 is mounted on a rotary table, and is rotated while the flame spraying is being performed. Thereby, the wear-resistant layers 16 are formed at the region including radially outer portions of the first and second convex portions 13 and 14. The flame spraying may be effected on only the first and second convex portions 13 and 14.

The large torsion springs 8 and the middle torsion springs 9 operate between the plates 3 and 4 and the flange 5a. When the plates 3 and 4 rotate relatively to the flange 5a due to a torsional vibration, the torsion springs 8 and 9 are repetitively compressed and expand. The torsion springs 8 and 9 are moved radially outward by a centrifugal force, and come into contact with the first and second convex portions 13 and 14. Thus, the torsion springs 8 and 9 slide on the radially outer portions of the first and second convex portions 13 and 14. Since the wear-resistant layers 16 are formed on the inside surface of the radially outer portions or spring contacting portions of the first and second convex portions 13 and 14, wear of the first and second convex portions 13 and 14 are suppressed compared with the prior art.

Since the wear-resistant layer 16 is formed by the HVAF flame spraying of the WC-CO material, it has a particularly high hardness and therefore a significantly improved wear resistance.

Since the HVAF flame spraying provides the wear-resistant layer having a low surface roughness, it is not necessary to perform polishing after the spraying.

Since the HVAF flame spraying exhibits a high compatibility with the WC-Co material, lowering of a performance of the material is suppressed.

Wear of the large and small torsion springs 8 and 9 is significantly reduced. This is because the wire spring metal material exhibits good compatibility with the WC-Co material applied by the HVAF flame spraying.

Second Embodiment

Figure 4:
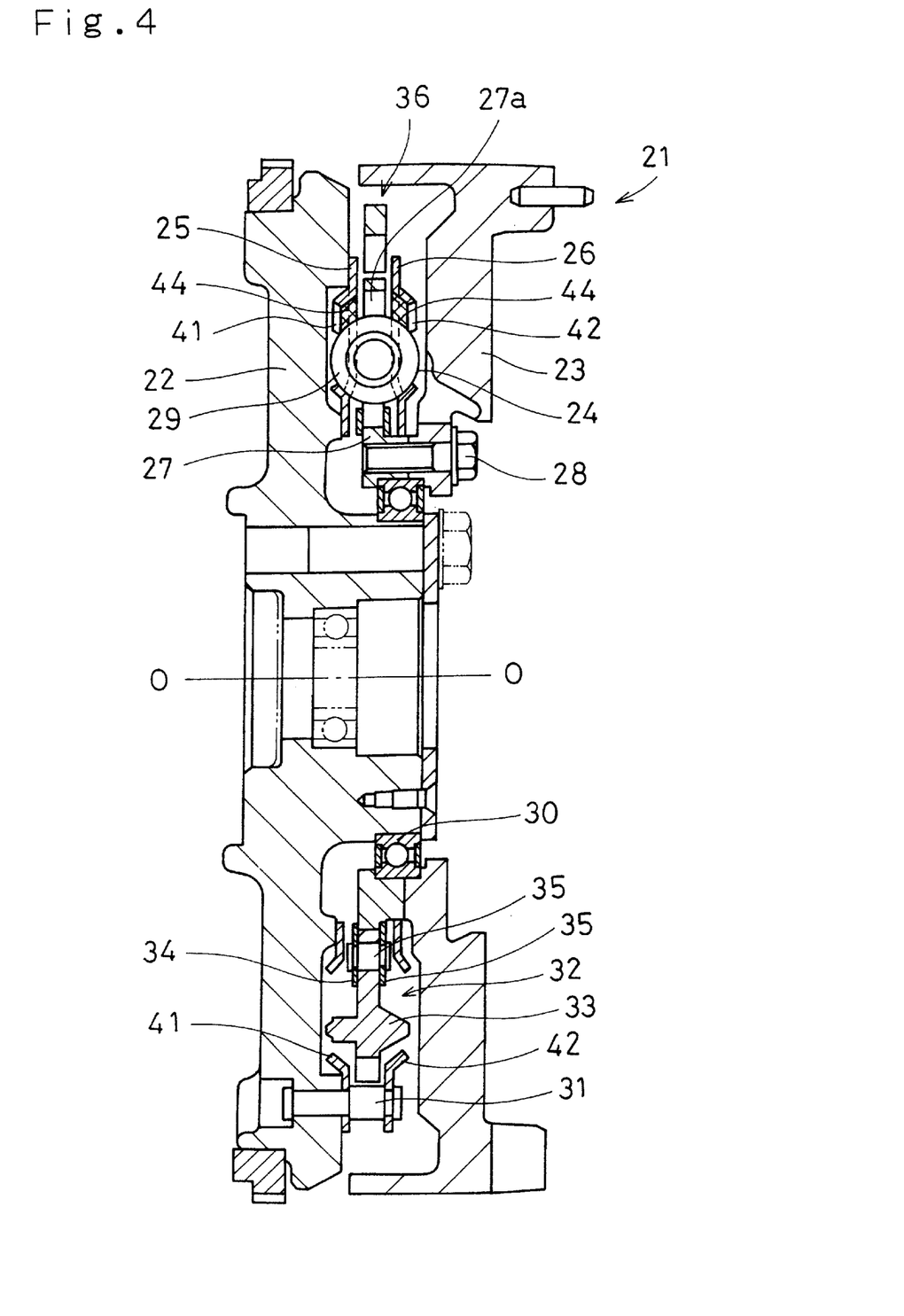
FIG. 4 is a schematic cross section side view of a flywheel assembly in accordance with a second embodiment of the present invention.
Figure 5:
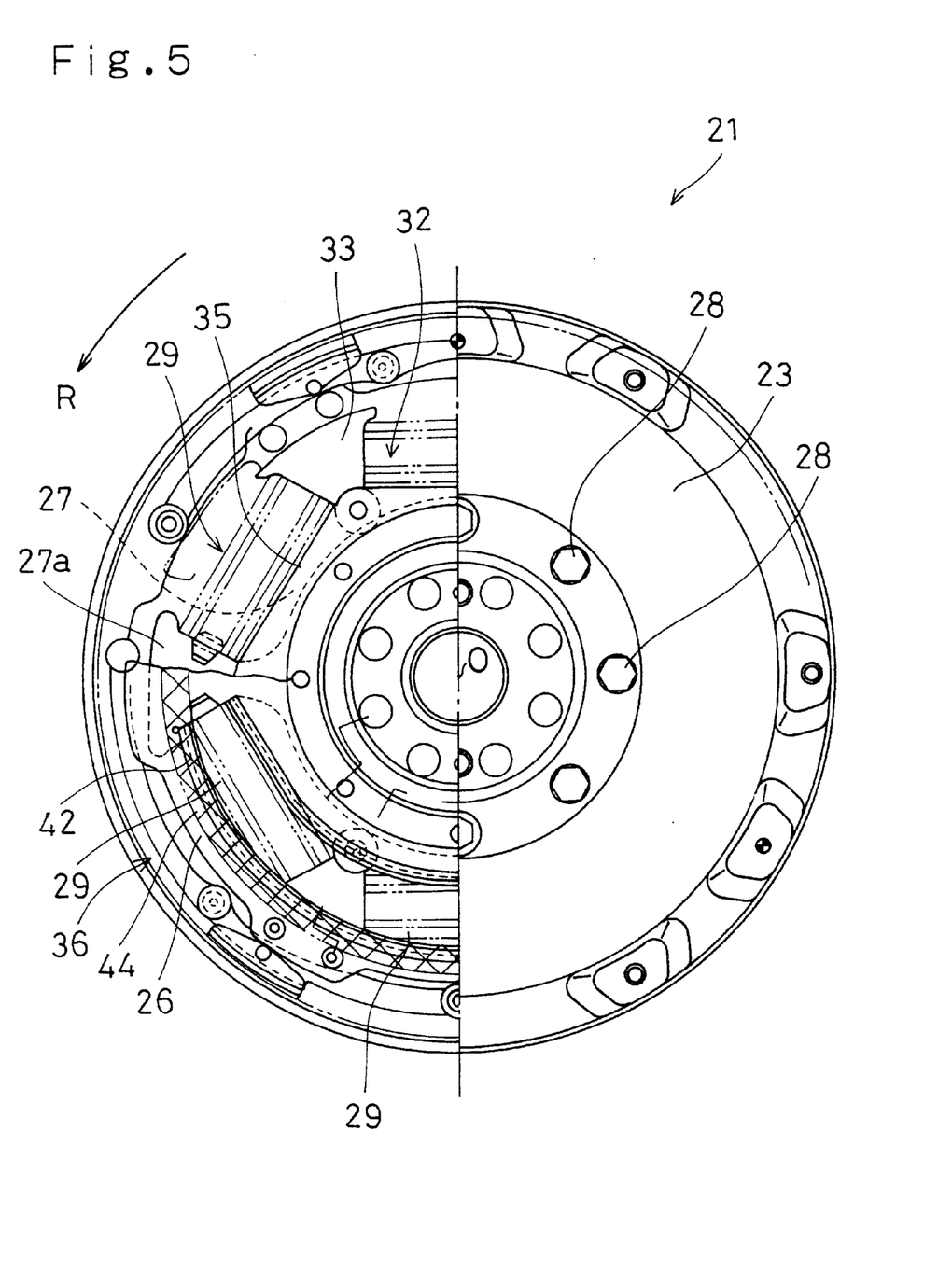
FIG. 5 is a part elevation, part cutaway rear view of the flywheel assembly depicted in FIG. 4.

FIGS. 4 and 5 show a flywheel assembly 21 of a second embodiment. The flywheel assembly 21 is a structure in which a conventional flywheel is divided into two portions and a damper mechanism is disposed therebetween, and is used in a vehicle. Line O—O shown in FIG. 4 represents a rotation axis of the flywheel assembly 21. The direction R shown in FIG. 5 is the rotating direction of the flywheel assembly 21.

The flywheel assembly 21 is formed of a first flywheel 22 coupled to a crank shaft (not shown) of an engine (not shown), a second flywheel 23 having a friction surface for engagement with a clutch disk of a clutch disk assembly, and a damper mechanism 24 disposed between the first and second flywheels 22 and 23.

The damper mechanism 24 is provided for transmitting a torque from the first flywheel 22 to the second flywheel 23 and for absorbing and damping a torsional vibration. The damper mechanism 24 is formed of a first plate 25 (first rotary member), a second plate 26 (first rotary member), a driven plate 27 (second rotary member) and a plurality of torsion springs 28 (springs).

The first and second plates 25 and 26, which are circular plates axially spaced from each other, have outer peripheral portions fixed together by pins 31, and are also fixed to an outer peripheral portion of the first flywheel 22.

The driven plate 27 has a circular form, and is disposed between the first and second plates 25 and 26.

The inner peripheral portion of the driven plate 27 is fixed to the inner peripheral portion of the second flywheel 23. The radially inner edges of the driven plate 27 and the second flywheel 23 are carried on the outer peripheral surface of the central cylindrical portion of the first flywheel 22 through a bearing 30. The driven plate 27 has a plurality of supports 7a projecting radially outward. Spaces between circumferentially neighboring supports 27a form retaining portions, respectively, in which torsion springs 29 are disposed.

Outer peripheries of these retaining portions are open in contrast to the windows in the first embodiment. Two torsion springs 29 which operate circumferentially in series are disposed in each retaining portion. A float structure 32 is interposed circumferentially between the two torsion springs 29 and therefore is also circumferentially disposed between adjacent supports 27a. The float structure 32 is formed of a float 33 having surfaces in contact with the torsion springs 29, and first and second support plates 34 and 35 which pivotably support the radially inner portions of the floats 33.

The first and second plates 25 and 26 are provided with cut and bent windows 41 and 42, respectively, each of which corresponds to the retaining portion and the two torsion springs 29. As shown in FIGS. 4 and 5, each of the cut and bent windows 41 and 42 is formed by partially cutting a portion of the plate 25 or 26, and bending axially outwardly the radially outer and inner portions of the cut portion to form the window.

The cut and bent windows 41 and 42 are located near the torsion springs 29, and restrict the radially and axially outward movement of the torsion springs 29.

The first and second plates 25 and 26 are provided at axially inner sides of their radially outer portions with wear resistant layers 44. The wear-resistant layer 44 is made of a WC-Co material applied by the HVAF flame spraying. Each wear-resistant layer 44 has an annular form as shown in FIG. 5. More specifically, the wear-resistant layers 44 are formed on the radially outer portions of the cut and bent portions defining the windows 41 and 42 as well as the flat portions radially outside the windows 41 and 42. Since the first and second plates 25 and 26 are provided at their spring slide portions with the wear-resistant layers 44, wear of the plates 25 and 26 are suppressed in spite of the fact that the torsion springs 29 slide thereon. Also, wear of the torsion springs 29 are significantly reduced.

The damper mechanism 24 can be considered that it is formed of the first and second circular plate members, the third circular plate member and the coil springs. The first and second plates 25 and 26 form the first and second circular plate members, respectively, and the driven plate 27 forms the third circular plate member. The cut and bent windows 41 and 42 form the retaining portions of the first and second circular plate members, and the spaces between the neighboring supports 27a of the driven plate 27 form the windows in the third circular plate member. It can also be considered that, in the damper mechanism 24, the wear-resistant layers 16 described before are formed at the spring contact portions of the retaining portions of the first and second circular plate members.

The wear-resistant layers may be formed only in the necessary portions, i.e., spring slide portions.

The wear-resistant layers may be formed on edges of the windows and/or recesses in the output member located between the flange and the driven plate.

Instead of the WC-Co material, a WC-Ni (Tungsten-Carbon-Nickel), WC-C (Tungsten-Carbon-Carbon) or WC-Ti (Tungsten-Carbon-Titanium) material may be used.

The damper mechanism according to the invention may be employed in devices other than the clutch disk assembly and the flywheel damper.

Experimental Data

Experiments were performed with a reciprocative wear test machine to compare wear of the plate and the torsion spring in an example according to the invention, in which the WC-Co material was flame-sprayed to the spring slide portion of the plate, with that of a comparative example, in which an Mo material was flame-sprayed to the spring slide portion of the plate.

In the example according to the invention, the HVAF flame spraying of the WC-Co material was effected on the plate after gas carbonitriding quenching and tempering. In the comparative example, flame spraying of the Mo material was effected on the plate after gas carbonitriding quenching and tempering. The torsion springs were made of SUP12 (equivalent to SWOSC-V, see JIS), and had a surface hardness of Hv600. The torsion springs carrying a predetermined load were caused to slide at a predetermined frequency on the plates. The above load was 196 N, and was applied with a frequency of 50 Hz and a reciprocation width of ±2 mm. A depth gauge was used to measure worn depths of the plates and torsion springs.

Figure 6:
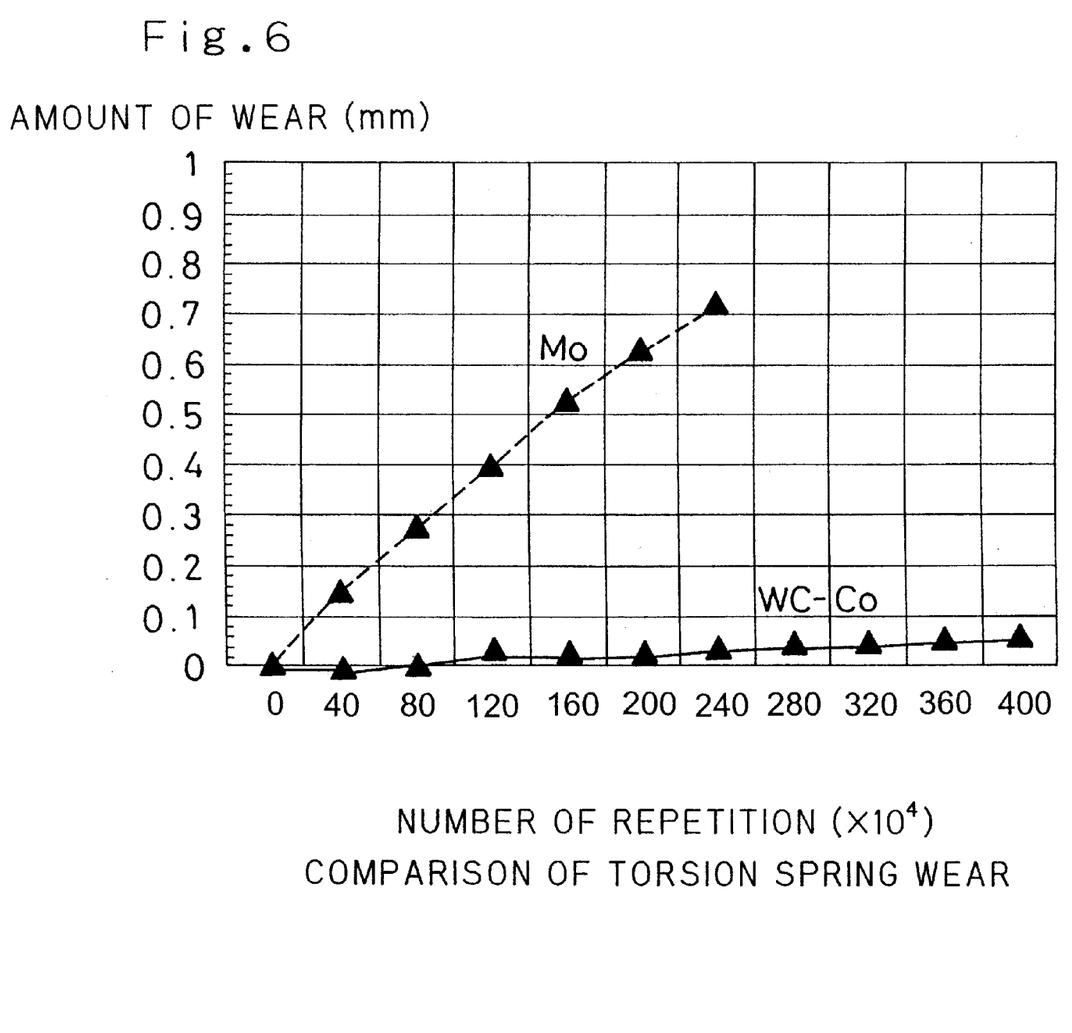
FIG. 6 is a graph showing results of a wear experimentation of the present invention.

As can be seen from a graph of FIG. 6, the example according to the invention using the WC-Co material could significantly suppress the wear of the torsion spring even when the times of slide increased. More specifically, the torsion spring was worn by 0.1 mm or less when the slide occurred $400 \times 10^4$ times. In the example using the Mo material, the torsion spring was significantly worn. More specifically, the quantity of wear exceeded 0.7 mm when the slide occurred about $240 \times 10^4$ times.

In both the examples, the quantities of wear were substantially equal to that of the plate to which the WC-Co material was applied. This shows that the quantities of wear were significantly reduced compared with that of a conventional plate subjected to only the gas carbonitriding quenching.

In the damper mechanism according to the invention, the wear-resistant layer is formed by flame spraying at the spring contact portion of at least one of the first and second retaining portions so that the wear of the spring contact portion can be suppressed.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A damper mechanism comprising:

a first rotary member having a first retaining portion, said first rotary member being made of an iron based material;

a second rotary member having a second retaining portion corresponding to said first retaining portion;

a spring disposed in said first and second retaining portions for circumferentially coupling said first and second rotary members together; and a wear-resistant layer formed by flame spraying using a high velocity air fuel system on a spring contacting portion of at least one of said first and second rotary members.

2. The damper mechanism according to claim 1, wherein said wear-resistant layer is made of hard metal.

3. The damper mechanism according to claim 1, wherein said wear-resistant layer is made of a WC-Co material.

4. The damper mechanism according to claim 1, wherein said spring is a coil spring made of a wire spring metal material.

5. A damper mechanism comprising:

first and second circular plate members fixed together with an axial space therebetween, each of said first and second circular plate members having retaining portions corresponding to one another, said first and second circular plate members being made of an iron based material;

a third circular plate member disposed between said first and second circular plate members, and provided with a window corresponding to said retaining portions;

a coil spring disposed between said retaining portions and said window for circumferentially coupling said first and second circular plate members to said third circular plate member; and a wear-resistant layer formed by HVAF (High Velocity Air Fuel System) flame spraying of a WC-Co material at a portion of each of said retaining portions relatively sliding on said coil spring.

* * * * *